March 24, 1925.                                                                1,530,955
F. N. PETTEGREW
AUTO DRIVE
Filed March 22, 1924
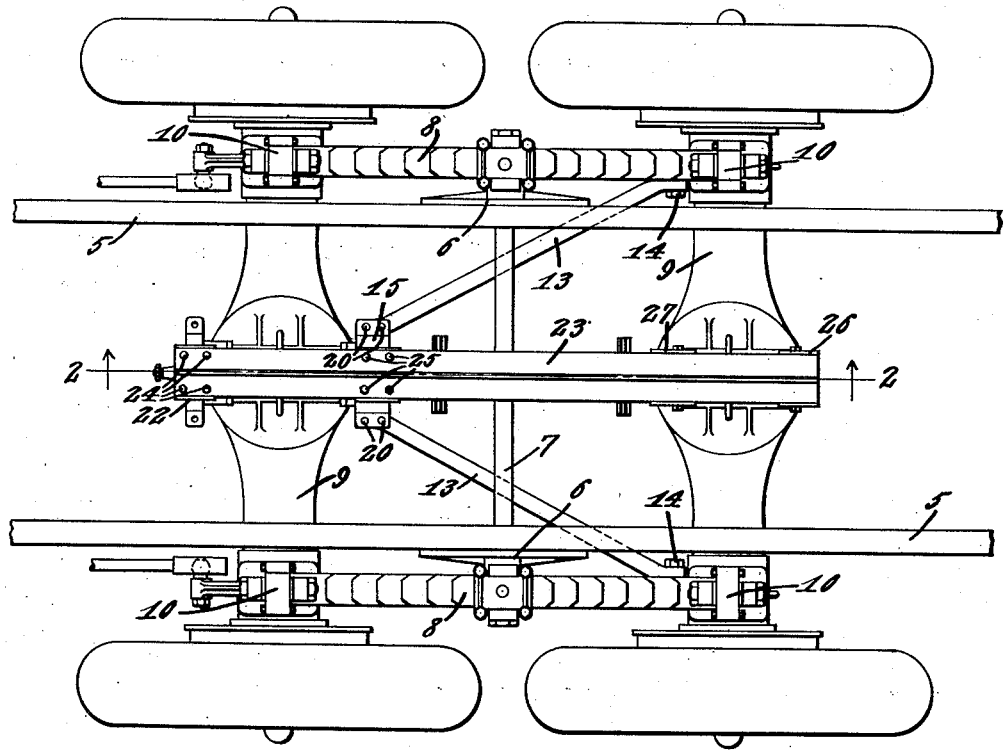
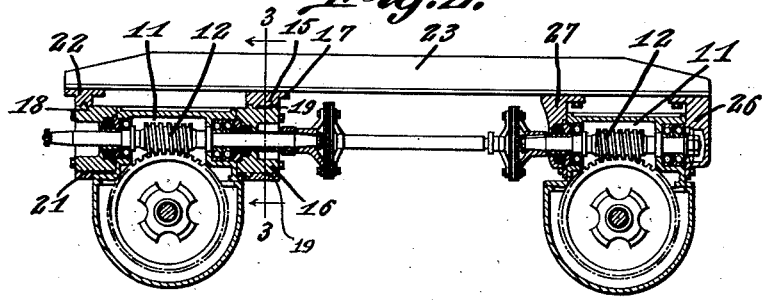
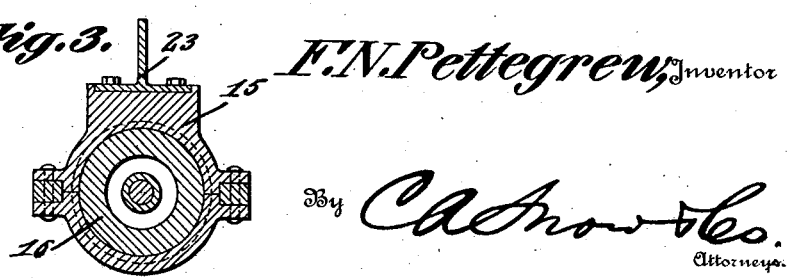
F. N. Pettegrew, Inventor
By C. A. Snow & Co.
Attorneys.

Patented Mar. 24, 1925.

1,530,955

UNITED STATES PATENT OFFICE.

FRED N. PETTEGREW, OF FOX LAKE, WISCONSIN.

AUTO DRIVE.

Application filed March 22, 1924. Serial No. 701,115.

*To all whom it may concern:*

Be it known that I, FRED N. PETTEGREW, a citizen of the United States, residing at Fox Lake, in the county of Dodge and State of Wisconsin, have invented a new and useful Auto Drive, of which the following is a specification.

The present invention has reference to motor vehicle construction, and more particularly to motor truck constructions of the six wheel type, wherein the drive axles of the motor are used in tandem.

The primary object of the invention is to provide means for connecting the axles in tandem, in such a way that rocking movement of one axle will be permitted independently of the adjacent axle, thereby reducing wear and strain on the bolts and connecting rivets, to the minimum.

Another important object of the invention is to provide a device of this character which will hold the axles in tandem in proper spaced relation with each other and insure against movement of one axle towards and away from the adjacent axle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view disclosing axles of a motor truck connected in tandem.

Figure 2 is a sectional view taken on line 2—2 of Figure 1.

Figure 3 is a sectional view taken on line 3—3 of Figure 2.

Referring to the drawing in detail, the reference charcter 5 designates side rails of a motor truck chassis, to which the brackets 6 are secured, which brackets supporting the bar 7 that has its ends extended beyond the side rails where they provide perches for the spring members 8 forming a part of the usual truck construction.

The forward and rearward ends of the spring members 8 have connection with the axle housings 9 at 10, so that movement of the axles with respect to the chassis will be cushioned.

Each axle housing is provided with a central enlarged portion providing a differential housing, the upper portion of each differential housing being offset as at 11 to provide a housing for the worm gear 12 operating therein. Radius rods indicated at 13 are bolted to the rear axle housing at 14, the forward ends thereof being connected to the differential housing associated therewith through the medium of the yoke 15 and worm gear housing 16.

The worm gear housing is formed with a rearwardly extended portion 17 and a forwardly extended portion 18, the rearwardly extended portion 17 being formed with a circumferential groove to receive the circular rib 19 of the yoke 15, so that rotary movement of the yoke with respect to the gear housing will be permitted, but movement of the gear housings away or towards each other will be prevented.

The radius rods are preferably supported between the sections of the yoke and held in such positions by means of the bolts 20. The forward extension 18 is formed with a rib 21 adapted to be fitted in the groove of the yoke 22, which yoke is secured to the torque bar 23, by means of bolts 24, while the yoke 15 is also connected to the torque bar by means of bolts 25.

This torque bar extends rearwardly and is connected with the members 26 and 27 which have connection with the rear axle housing in any well known manner.

From the foregoing it will be obvious that due to this construction, the front axle of the tandem drive will be permitted to rock or move in vertical planes independently of the rear axle housing or axle associated therewith to the end that an even drive will be maintained between all the wheels of the four wheel drive construction.

I claim:—

1. In a device of the character described, adjacent axle housings, one of said axle housings including a gear casing formed with extensions, a yoke comprising separable sections adapted to be secured around one of the extensions, radius rods having connection with the yoke, and said yoke adapted to permit the axles to move independently of each other.

2. In a device of the character described, adjacent axle housings, one of said axle housings including an upper gear casing formed with extensions, one of said extensions having a groove, a yoke having a rib fitted in the groove, bracket members secured to one of the housings, a torque bar for connecting the bracket members and yoke to permit of movement of the axle housings in vertical planes, and said torque bar adapted to hold the axle housings in spaced relation with each other.

In testimony that I claim the foregoing as my own, I have hereto affixed my signature in the presence of two witnesses.

FRED N. PETTEGREW.

Witnesses:
W. E. HOTCHKISS,
D. C. CHURCH.